US008355676B2

(12) United States Patent  (10) Patent No.: US 8,355,676 B2
Franklin  (45) Date of Patent: Jan. 15, 2013

(54) SYSTEM AND METHOD FOR REDUCING RADIO FREQUENCY INTERFERENCE

(75) Inventor: Roger James Franklin, Suwanee, SC (US)

(73) Assignee: Franklin Technologies, LLC, Suwanee, GA (US)

( * ) Notice: Subject to any disclaimer, the term of this patent is extended or adjusted under 35 U.S.C. 154(b) by 713 days.

(21) Appl. No.: 12/620,300

(22) Filed: Nov. 17, 2009

(65) Prior Publication Data

US 2011/0117853 A1   May 19, 2011

(51) Int. Cl.
   *H04B 1/00*    (2006.01)
   *H04B 15/00*   (2006.01)

(52) U.S. Cl. .................. 455/63.1; 455/67.11; 455/67.13; 455/67.7; 455/68; 455/69; 455/296; 455/418; 455/419; 455/420

(58) Field of Classification Search .................. 455/500, 455/502, 507, 509, 512, 513, 516, 63.1, 67.11, 455/67.13, 67.7, 296, 68, 69, 418–420; 375/346; 370/445, 447
   See application file for complete search history.

(56) References Cited

U.S. PATENT DOCUMENTS

| | | | |
|---|---|---|---|
| 5,274,665 A | 12/1993 | Schilling | |
| 5,649,303 A | 7/1997 | Hess et al. | |
| 5,926,758 A | 7/1999 | Grybos et al. | |
| 6,542,739 B1 | 4/2003 | Garner | |
| 6,639,520 B2 * | 10/2003 | Nomura et al. | 340/905 |
| 6,704,546 B1 | 3/2004 | Lucidarme et al. | |
| 6,704,557 B1 * | 3/2004 | Krishnamurthy et al. | 455/278.1 |
| 6,807,165 B2 | 10/2004 | Belcea | |
| 6,922,551 B1 | 7/2005 | Bristow et al. | |
| 6,925,293 B2 * | 8/2005 | Lindenmeier et al. | 455/276.1 |
| 6,928,280 B1 | 8/2005 | Xanthos et al. | |
| 7,039,317 B2 | 5/2006 | McGregor | |
| 7,054,296 B1 | 5/2006 | Sorrells et al. | |
| 7,146,133 B2 * | 12/2006 | Bahl et al. | 455/63.1 |
| 7,149,205 B2 | 12/2006 | Nakamura et al. | |
| 7,277,451 B1 | 10/2007 | Chen et al. | |
| 7,729,257 B2 * | 6/2010 | Kodialam et al. | 370/235 |
| 7,792,224 B2 * | 9/2010 | Meixner et al. | 375/346 |

(Continued)

FOREIGN PATENT DOCUMENTS

WO    WO 01/97553 A2    12/2001

(Continued)

OTHER PUBLICATIONS

Written Opinion and International Search Report PCT/US2010/052678, dated Dec. 3, 2010.

*Primary Examiner* — Tuan A Tran
(74) *Attorney, Agent, or Firm* — Dority & Manning, P.A.

(57) ABSTRACT

A system and method for determining the source of and/or reducing radio frequency interference in an RF communications system is disclosed. The system and method is configured to compare first transmission data and second transmission data for conflicts and provide notification of a conflict to a relevant entity. The first transmission data can include first frequency data, first destination data, and first time data for an RF transmission associated with the first RF device. The second transmission data can include second frequency data, second destination data, and second time data. The system and method analyzes the first transmission data and the second transmission data for any conflicts and can provide notification of any conflicts or potential conflicts to interested parties.

25 Claims, 5 Drawing Sheets

U.S. PATENT DOCUMENTS

| | | | |
|---|---|---|---|
| 7,830,995 B2 * | 11/2010 | Ojard | 375/346 |
| 7,848,741 B2 * | 12/2010 | Kivekas et al. | 455/423 |
| 8,189,710 B2 * | 5/2012 | Guo et al. | 375/295 |
| 2004/0058645 A1 | 3/2004 | Brenner | |
| 2004/0146056 A1 | 7/2004 | Martin | |
| 2005/0075077 A1 | 4/2005 | Mach et al. | |
| 2007/0066226 A1 | 3/2007 | Cleveland et al. | |
| 2008/0214116 A1 | 9/2008 | Leung Hang et al. | |
| 2009/0185648 A1 * | 7/2009 | Gau | 375/346 |
| 2009/0190641 A1 * | 7/2009 | Yang | 375/224 |
| 2010/0135439 A1 * | 6/2010 | Lackey | 375/344 |

FOREIGN PATENT DOCUMENTS

| | | |
|---|---|---|
| WO | WO 01/97553 A3 | 12/2001 |

\* cited by examiner

SYSTEM AND METHOD FOR REDUCING RADIO FREQUENCY INTERFERENCE

FIELD OF THE INVENTION

The present invention relates generally to radio frequency (RF) communications systems and more particularly to a system and method for reducing radio frequency interference (RFI) caused by the overlap in frequency, destination, and time of RF communication signals.

BACKGROUND OF THE INVENTION

RF communications systems employ RF transmission signals to communicate data or other information from one location to another location. Typical fixed frequency RF communications systems allow a single RF transmission within a given frequency range, physical location or destination, and time. Exemplary fixed frequency communication networks include satellite communication networks, terrestrial microwave links, WiMax networks, cellular networks, and lighter-than-air RF relay networks.

Conflicts between RF transmission signals in frequency, destination and time can result in radio frequency interference. RFI generally leads to lost data integrity and transmission failures, resulting in inefficiency and unreliability of the communications system. The recent increase in RF transmissions, particularly in the satellite industry, has generated significant costs associated with the diagnosing and recovering from RFI.

RFI may be attributable to human error. For instance, errors may occur during transponder booking and/or while setting up an RF transmission that lead to conflicts between RF transmission signals resulting in RFI. In other circumstances, RFI may result when a transmission extends beyond an allotted time. Current solutions to mitigate or prevent accidental RFI include addressing the human error aspect through proper training A majority of the RFI in the satellite communication industry is accidental. However, even through proper training, the human error aspect can never be completely avoided.

Another solution to mitigate the effect of RFI includes the embedding of a carrier ID within an RF transmission signal. Typically, the carrier ID is an embedded aspect and the RF transmission must first be demodulated and decoded to access the carrier ID. Determining the modulation scheme for an unknown RF transmission can be difficult, time consuming and costly. Moreover, carrier ID technology is designed to reduce the time necessary to determine the source of RFI. Current carrier ID technology generally does not include the capability to prevent future RFI from occurring.

Thus, there is a need for a system and method that can reduce and/or prevent RFI due to conflicts between RF transmission signals in RF communications systems.

BRIEF DESCRIPTION OF THE INVENTION

Aspects and advantages of the invention will be set forth in part in the following description, or may be obvious from the description, or may be learned through practice of the invention.

One exemplary embodiment of the present disclosure is directed to a method for reducing radio frequency interference in an RF system. The method includes receiving first transmission data. The first transmission data includes first frequency data, first destination data, and first time data for at least one RF transmission associated with an RF device. The method further includes receiving second transmission data. The second transmission data includes second frequency data, second destination data, and second time data for at least one RF transmission. The method further includes storing the first transmission data and the second transmission data in a database and determining if there is a conflict between the first transmission data and the second transmission data.

Another exemplary embodiment of the present disclosure is directed to a system for reducing radio frequency interference in an RF system. The system includes a first module configured to collect first transmission data and a second module configured to collect second transmission data. The system includes a database configured to store the first transmission data and the second transmission data. The system further includes a processor configured to analyze the first and second transmission data to determine if there is a conflict between the first transmission data and the second transmission data.

Yet another exemplary embodiment of the present disclosure is directed to a method of determining the source of radio frequency interference. The method can include receiving first spectrum data from a first location; receiving second spectrum data from a second location; overlaying the first spectrum data and the second spectrum data in a user interface to compare the first spectrum data and the second spectrum data; and determining a source of the conflict from the comparison of the first spectrum data and the second spectrum data.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For example, server processes discussed herein may be implemented using a single server or multiple servers working in combination. Databases and applications may be implemented on a single system or distributed across multiple systems. Distributed components may operate sequentially or in parallel.

When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the other computer uses to access the actual data from a still further computer.

The various computer systems discussed herein are not limited to any particular hardware architecture or configuration. Embodiments of the methods and systems set forth herein may be implemented by one or more general-purpose or customized computing devices adapted in any suitable manner to provide desired functionality. The device(s) may be adapted to provide additional functionality complementary or unrelated to the present subject matter, as well. For instance, one or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including, but not limited to application-specific circuits. Of course, combinations of computer-executed software and hard-wired logic or other circuitry may be suitable, as well.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

Any suitable computer-readable medium or media may be used to implement or practice the presently-disclosed subject matter, including, but not limited to, diskettes, drives, and other magnetic-based storage media, optical storage media, including disks (including CD-ROMs, DVD-ROMs, and variants thereof), flash, RAM, ROM, and other memory devices, and the like.

The present disclosure also makes reference to the relay of communicated data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

Generally, the present disclosure is directed to a system and method for reducing RFI in an RF system caused by, for instance, the overlap in frequency, destination, and time of RF transmission signals. The system and method collects transmission data from one or more actual and/or planned RF transmissions, including frequency data, destination data, and time data associated with the RF transmission, and analyzes the RF transmission data for conflicts.

As used herein, the term "frequency data" is intended to refer to data relating to the frequency of an RF transmission and can include, for instance, center frequency and bandwidth for an RF transmission. The term "destination data" is intended to refer to data relating to the transmission destination and/or location of an RF transmission. The term "time data" is intended to refer to data related to the timing of an actual or planned RF transmission. Other data that can be included as part of transmission data includes, for instance, user information, modulation parameters, and power level.

The transmission data can be actual transmission data for one or more RF transmissions. The transmission data can also be planned transmission data for one or more RF transmissions. The actual and or planned transmission data for one or more RF transmissions can be stored into a database. As used herein, the term "database" is intended to refer to any storage medium capable of storing electronic information.

A processor can analyze the transmission data for conflicts. A conflict can occur between transmission data whenever there is an increased likelihood for RFI between RF transmissions. An operator or other user can define parameters that dictate when a conflict between transmission data occurs. Using the disclosures provided herein, those of ordinary skill in the art will understand that a variety of different algorithms, programs, software, and/or other suitable tools can be used to analyze the transmission data for conflicts in accordance with the exemplary embodiments discussed herein.

For instance, in one embodiment, a conflict can occur when the frequency data, the destination data, and the time data for two or more actual and/or planned RF transmissions at least partially overlap so as to create the possibility of an RFI event. A user can define the circumstances in which the frequency data, destination data, or timing data for two or more actual and/or planned RF transmissions at least partially overlap. For instance, in a particular embodiment, frequency data for two or more RF transmissions may be defined to at least partially overlap if the edge of the frequency band for one RF transmission is within a predefined percentage, such as 5%, of the edge of the frequency band for a different RF transmission.

In another embodiment, a conflict can occur when an actual transmission does not match up with a planned RF transmission. For example, a conflict can exist if the actual RF transmission lies outside a planned frequency range or allotted time. The processor can compare the actual transmission data to planned transmission data to determine if the actual frequency data is not the same as the planned frequency data, to determine if the actual destination data is not the same as the planned destination data, or to determine if the actual time data is not the same as the planned time data. Failure of the actual transmission data to match up to the planned transmission data can result in a conflict.

Embodiments of the present disclosure also provide for notification of any determined conflicts to interested parties. Notification can be provided through a variety of media avenues to interested parties so that actions can be taken to prevent an RFI event or to remedy an RFI event. For instance, when a conflict is identified, an alert message can be sent through any readily available communication channel to relevant RF transmission providers, including the transmitter causing the interference and the transmitter experiencing the interference. Early detection and notification to relevant parties of a potential conflict can significantly reduce the prospect of RFI before the RFI event even occurs. In this manner, the systems and methods of the present disclosure can be used to reduce RFI and can be used to prevent RFI events from ever occurring.

Figure 1:
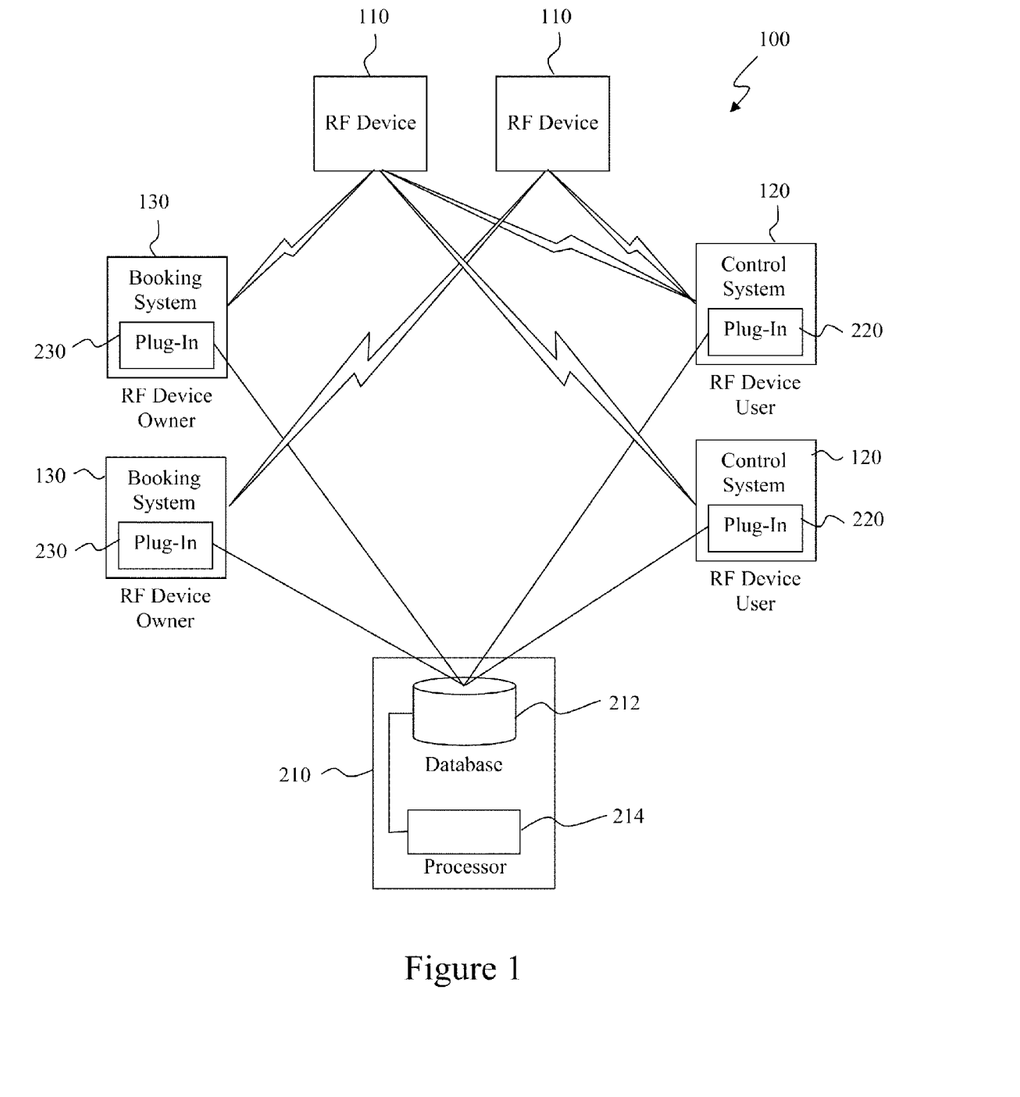
FIG. 1 provides a block diagram of an exemplary system according to an exemplary embodiment of the present disclosure.

With reference now to the Figures, FIG. 1 depicts an exemplary RF transmission system 100 that includes a system 200 (shown in detail in FIG. 2) for reducing RFI according to one exemplary embodiment of the present disclosure. As illustrated, RF transmission system 100 can have one or more RF devices 110. RF devices 110 can be transponders, receivers, transmitters, or any other RF devices. For instance, in a particular embodiment, RF devices 110 can include satellite transponders used in a satellite based RF transmission system.

The RF devices 110 can be configured to transmit or receive one or more RF transmission signals from a variety of sources. The RF devices 110 can receive signals from two different sources, including RF device owners and RF device users. RF device owners typically send control signals to RF devices 110 to control or regulate operation of the RF devices 110. For instance, in certain circumstances, RF device owners can transmit control signals to an RF device 110 from a booking system 130. The booking system 130 can be used to control future allocation of the RF device 110. For instance, booking system 130 can be used to generate a schedule of planned RF transmissions for RF device 110.

A source of RF transmissions to RF devices 110 includes RF device users. These RF transmissions are typically used to communicate data from one location to a remote location. For instance, in a satellite RF transmission system, a satellite can be used to relay an RF transmission from a transmitter to a receiver. RF transmission users can use a control system 120 and/or a monitoring system that controls and monitors RF transmissions to and from RF devices 110. As will be discussed in detail below, control system 120 can be used to monitor actual RF transmissions to RF devices 110 and can also be used collect other data, such as spectrum data, for the RF transmissions. For the purpose of this disclosure, a control system can also be a single RF device's internal control mechanism and logic, such as relays, switches, or firmware.

FIG. 1 includes a system 200 (illustrated in FIG. 2) for reducing RFI in RF transmission system 100. The system 200 includes a server system 210 having a database 212 and a processor 214. The system can also include one or more first plug-in modules 220 associated with one or more control systems 120. The system can further include one or more second plug-in modules 230 associated with one or more booking systems 130. The first plug-in modules 220 and the second plug-in modules 230 can communicate data, such as transmission data, destination data, and time data, to server system 210 over a network.

Figure 2:
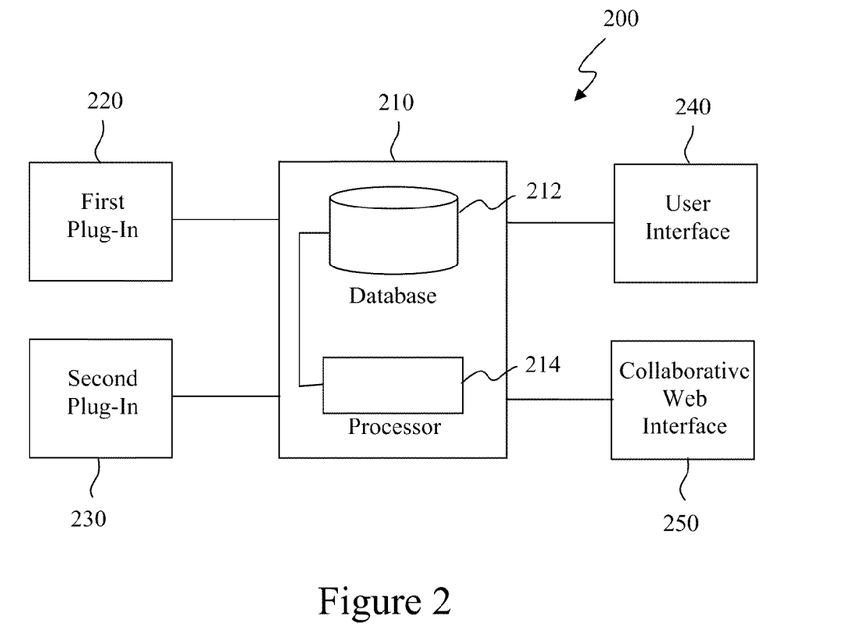
FIG. 2 provides a block diagram of an exemplary system according to an exemplary embodiment of the present disclosure.

With reference now to FIG. 2, system 200 will be discussed in detail. System 200 can include a server system 210, a first plug-in module 220, a second plug-in module 230, a user interface 240, and a collaborative web interface 250. Server system 210 is used to receive and store transmission data and to analyze transmission data for conflicts. Server system 210 can be a single server or can include redundant servers networked together over, for instance, the Internet.

Server system 210 can include a database 212 configured to store actual and/or planned transmission parameter data received from first plug-in module 220 and second plug-in module 230. Actual transmission data refers to real-time information about actual RF device usage. Such information can be updated from a first plug-in module 220 or can be manually entered via a user interface 240 or collaborative web interface 250. Actual RF transmission parameter data can include, but is not limited to the following information: location (e.g. RF device name and location), destination, time, frequency, center frequency, bandwidth, polarity, power level, user ID, content type, content value, modulation type, rate, carrier ID, and/or other suitable parameters.

In a particular embodiment, actual transmission data can include an RF transmission routing table. The RF transmission routing table can include information that defines the equipment for an RF transmission chain associated with an RF device. For instance, the RF transmission routing table can include information concerning how each RF device is connected to other RF devices, including the final transmission port on an RF antenna.

A processor 214 of server system 210 can utilize an RF transmission routing table to determine, for example, radio frequency range in use, the power level of an RF transmission, and the final destination (destination data) of the RF transmission. If RF switches exist in the transmission path, they can be included in the RF transmission routing table so that the processor 214 can determine if an RF transmission is one switch away from transmitting an RF signal.

Planned transmission data refers to information about planned RF device usage at a future date and time, including for example, lease information. Information can be updated automatically from a second plug-in module 230, can be entered manually through a user interface 240 or collaborative web interface 250, and can even be based on a previous usage patterns. Planned transmission data can include, but is not limited to the following information: location (i.e. RF device name and location), destination, frequency, center frequency, bandwidth, polarity, start and end times, lessee, content type, content value, modulation type, rate, carrier ID and/or other suitable parameters.

Other information or data that can be stored at database 212 can include contact information for companies and individuals in a particular industry, both for RF device owners and RF device users. Database 212 can also act as a repository for data and statistics relating to particular conflicts and RFI events. This data can be used for example, by the collaborative web interface 250 to archive and display information associated with a particular RFI event or conflict as reference data.

Still referring to FIG. 2, server system 210 can include processor 214. Processor 214 is configured to determine conflicts between actual and/or planned RF transmission data every time RF transmission data is updated and at regular intervals. An operator can define parameters that dictate when a conflict between transmission data occurs. For example, in one embodiment, a conflict can occur when the frequency data, the destination data, and the timing data for two or more actual and/or planned RF transmissions at least partially overlap so as to create the possibility of an RFI event. In another embodiment, a conflict can occur when an actual transmission does not match up to a planned RF transmission. For instance, a conflict can exist if the actual RF transmission lies outside a planned frequency range or allotted time. If a conflict is identified by processor 214, an RFI event can be created and remain active until the actual RF parameter data indicates that the conflict no longer exists or until the RFI event is manually closed by an operator or other user.

Figure 3:
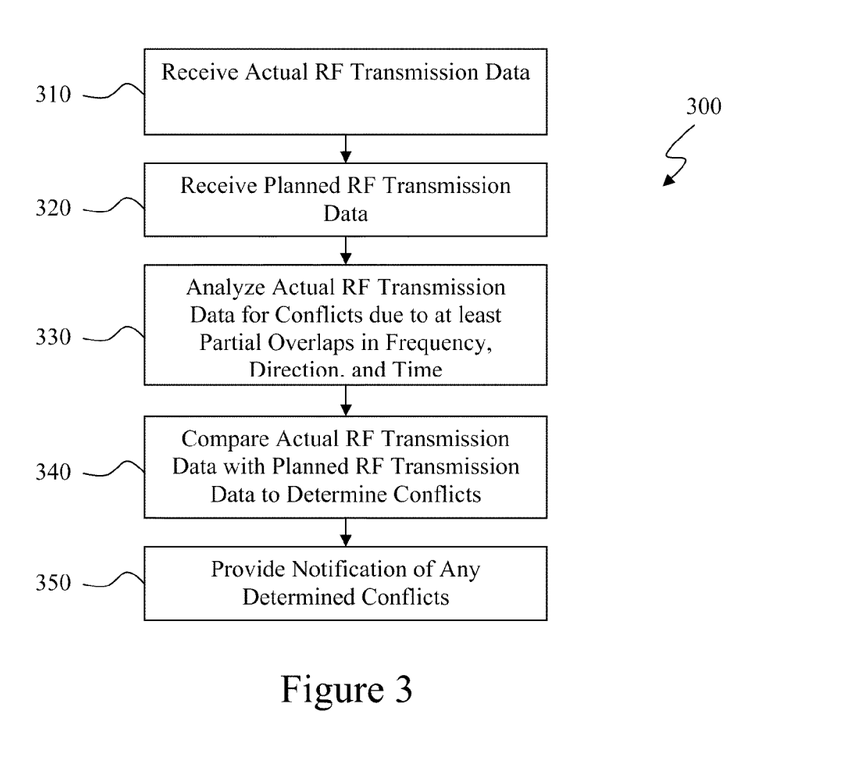
FIG. 3 provides a flow diagram of an exemplary method according to an exemplary embodiment of the present disclosure.

Referring to FIG. 3, a flow diagram is illustrated for an exemplary method 300 according to one exemplary embodiment of the present disclosure. At 310, actual RF transmission data is received. At 320, planned RF transmission data is received. At 330, actual RF transmission data is analyzed for conflicts due to at least partial overlaps in frequency, destination, and time. At 340, actual RF transmission data is compared with planned RF transmission data to determine conflicts. At 350, notification of conflicts is provided to interested or relevant entities.

In particular embodiments, system 200 is configured to provide notice to interested parties of an RFI event. Each time an RFI event is created or identified by system 200, notification rules as defined by an operator or other user are applied to the RFI event to send notification messages to relevant parties through preferred channels of communication. Such notification rules can include, but are not limited to, one or more of the following: (1) notify only if specific RF devices are being interfered with; (2) notify if RF devices are about to interfere with another owner's RF device; (3) notify if any interference occurs adjacent to a particular RF device; (4) notify if a particular RF device is about to be interfered with; (5) suppress notification if a predefined backup facility is about to interfere with a particular RF device; (6) notify if interference is occurring and there is a possibility the party receiving notification may be responsible; (7) notify via text message; (8) notify via email; (9) notify via taskbar application; (10) notify via a pop-up alert message; (11) notify via any available or to be made available media or medium. Those of ordinary skill in the art, using the disclosures provided herein, should readily understand that a variety of different notification rules can be used without deviating from the scope of the present disclosure.

The notification rules can filter out entities that have opted not to be notified of RFI events. If one of the specific entities to be notified, such as an RFI source, cannot be immediately identified, previous data can be used, such as time of day, location, frequency, bandwidth, or other suitable data, to narrow the list of suspected RFI sources. For example, if an RFI event occurs at 13:00 at a particular RF device with a bandwidth of 25 MHz, the processor 214 can be configured to search for all previous transmissions that occurred at 13:00 with a bandwidth of 25 MHz for that particular RF device. The source of each of these previous transmissions can then be notified that it could be a potential source of RFI. If none are found, the processor 214 can be further configured to look for previous transmissions associated with adjacent RF devices with varying bandwidths and varying times.

Notifications can be delivered using any available or to be available media and/or communication channels, including, for instance, text message and email services. The notifications can contain details about the specific RF device that is experiencing conflict in addition to including a URL to the server system 210 for the specific RFI event that was created for the conflict. In particular embodiments, notifications can be provided to a third party message delivery server that handles particular types of messages. Notifications that are sent to, for example, a taskbar application on user interface 240 or to a control system 120 through first plug-in module 220 can be sent within a heartbeat reply to the taskbar application or the first plug-in module 220. The first plug-in module 220 or taskbar application can then forward the notification to the control system 120 or user interface 240 respectively for pop-up display. Notifications delivered to a booking system 130 through second plug-in module 230 can similarly be sent within a heartbeat reply to the second plug-in module 230.

In particular embodiments, system 200 can be configured to receive power level data associated with an RF event. If the actual RF power level is zero or substantially less than the noise floor or if the RF transmission chain is one switch away from transmitting an RFI signal, the notification can be provided as a warning. Under this condition, the RFI event has not yet occurred, but could occur as soon as power is supplied or the switch is set to on. By providing warnings to particular entities that a particular transmission will cause RFI as soon as power is supplied, embodiments of the present disclosure can be used to prevent future RFI events from ever occurring.

Figure 4:
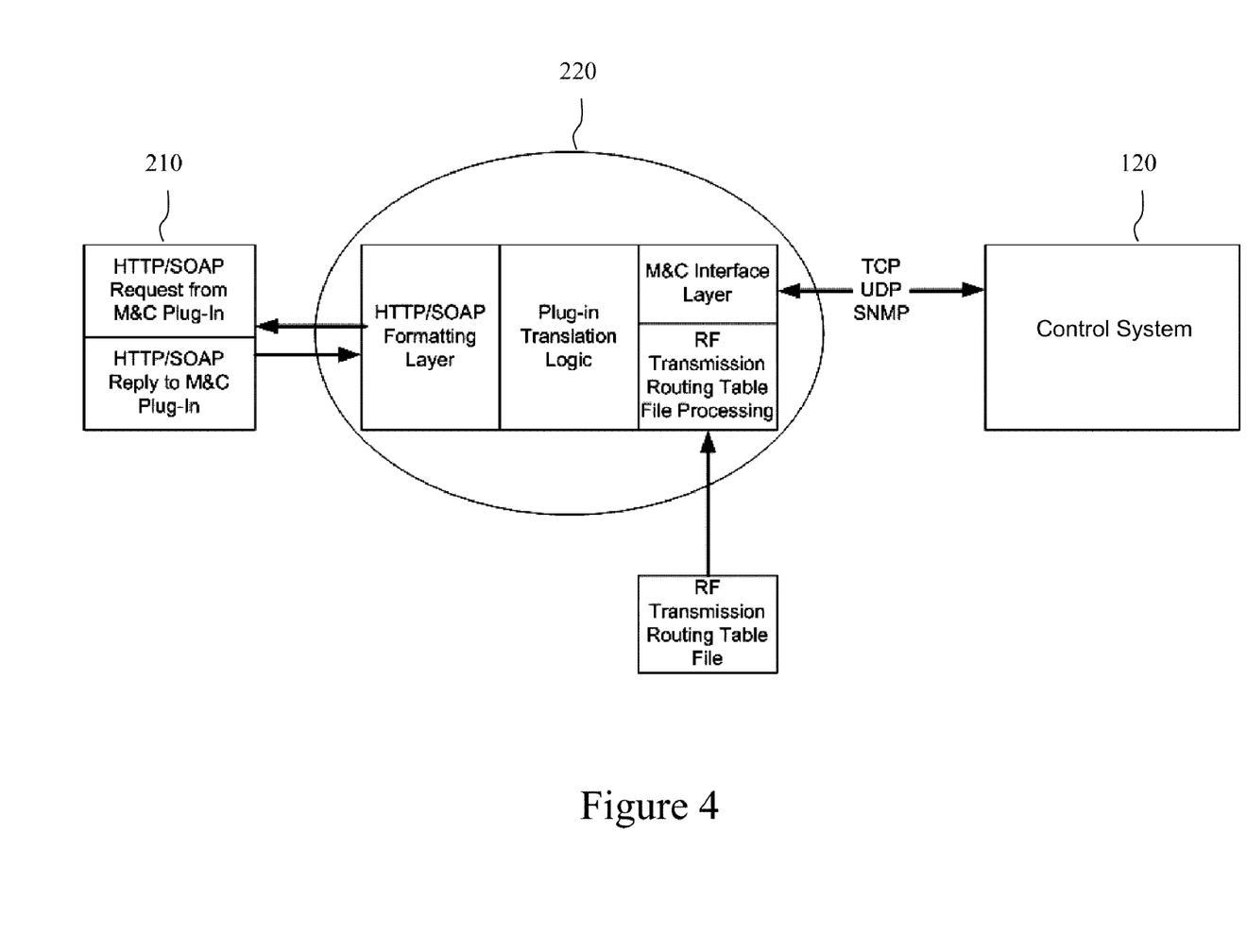
FIG. 4 provides a diagram of an exemplary module used to extract actual RF transmission parameter data according to an exemplary embodiment of the present disclosure.

FIG. 4 depicts a diagram associated with an exemplary first plug-in module 220 for communicating actual RF transmission parameter data from a control system 120 to server system 210. First plug-in module 220 can be a monitor and control plug-in module associated with a control system 120 or associated with a stand-alone computing device. The first plug-in module 220 can also be a firmware plug-in module associated with one or more RF devices. The first plug-in module 220 can initiate communications with server system 210 using, for instance, HTTP/SOAP requests. Server system 210 can return data to the first plug-in module 220 using, for instance, HTTP/SOAP replies. These messages can travel within a Virtual Private Network (VPN), can be encrypted using Secure Socket Layer (SSL) technology, or can be communicated using standard HTTP. Each request message can include a source ID which can be used to identify the particular plug-in module.

For each control system 120, a unique RF transmission routing table can be created either manually or by the control system 120. The RF transmission routing table can be stored in a file on a computing device having the first plug-in module 220. When the radio frequency transmission routing table is first created or modified, the first plug-in module 220 can send the RF transmission routing table to the server system 210.

After validating communications with server system 210, first plug-in module 220 can periodically send heartbeat request messages to the server system 210, such as at about every 5.0 seconds. First plug-in module 220 can be interfaced with control system using any communication protocol, including a TCP socket connection, a proprietary communication method, or an open source communication method. First plug-in module 220 can also connect to control system 120 and extract initial RF device parameters as well as future changes for RF device parameters. Additionally, the first plug-in module 220 can interface directly with RF device equipment by being embedded within the RF device firmware. Request messages sent to server system 210 containing updated parameter values, for instance for devices identified in an RF transmission routing table, can be sent in between heartbeat messages. Server system 210 can respond to each request with an all clear code or notification of an RFI event.

One type of device that first plug-in module 220 can collect parameter values from is a spectrum analyzer. The data from this device can be made available to user interface 240 or to collaborative web interface 250 (FIG. 2). According to one exemplary embodiment of the present disclosure, spectrum data from two or more locations can be compared to determine the source of RFI when an RFI event is reported. By comparing multiple sources of the same spectrum data, an RFI event may be able to be quickly isolated to either the transmit side of an RF device or a receiver side of an RF device.

Figure 6:
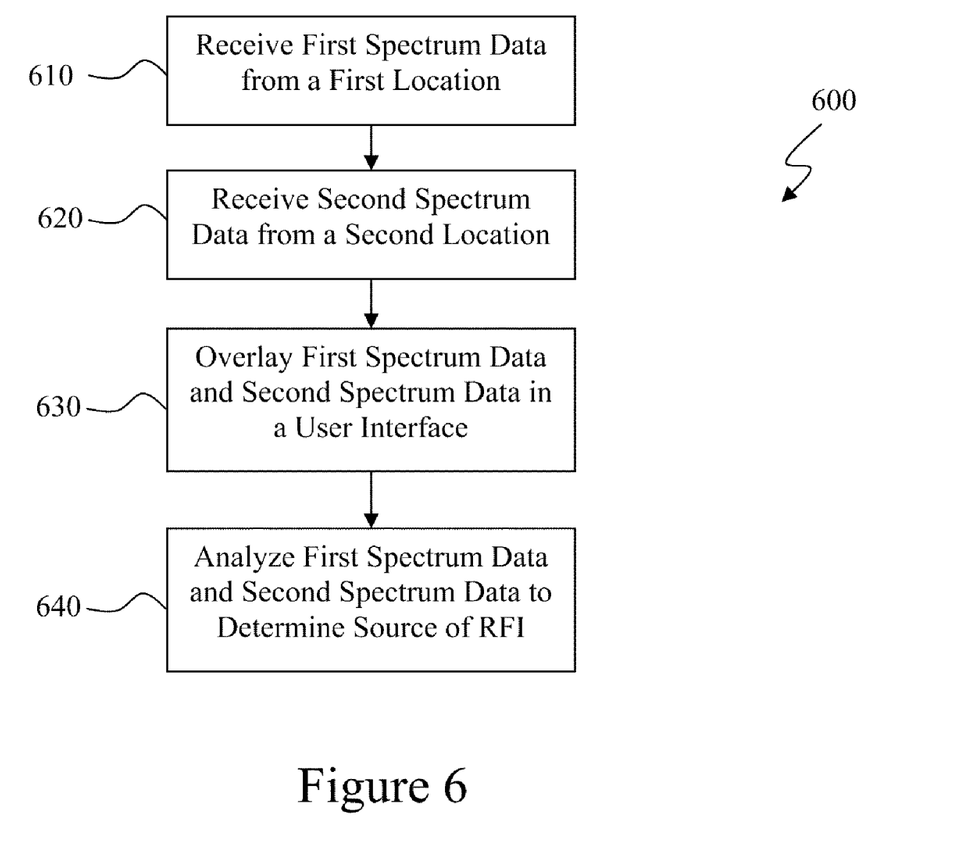

Referring now to FIG. 6, a flow diagram illustrating an exemplary method 600 according to an exemplary embodiment of the present disclosure is illustrated. At 610, first spectrum data is received from a first location associated with an RF device. For example, first spectrum data can be received from a transmitter originating an RF transmission to a satellite transponder. At 620, second spectrum data is received from a second location associated with an RF device. For example, second spectrum data can be received from a receiver receiving an RF transmission from a satellite transponder. At 630, the first spectrum data and the second spectrum data are overlayed in a user interface so that a user can visually inspect and compare the first spectrum data and the second spectrum data. At 640, the first and second spectrum data are analyzed to determine the potential source of RFI. For example, if RFI is located only in the first spectrum data, the source of RFI can be local to the first location. If RFI is located only in the second spectrum data, the source of RFI can be local to the second location. If RFI is located in both the first spectrum data and the second spectrum data, the source of RFI can be local to an RF device.

First plug-in module 220 can support protocol terminology that allows server system 210 to send actionable commands to first plug-in module 220. When first plug-in module 220 receives those commands, the commands can be formatted, as required by the control system 120 and delivered to the control system 120 which then issues commands to the controlled equipment. In this manner, first plug-in module 220 can be used to execute commands provided by server system 210.

Figure 5:
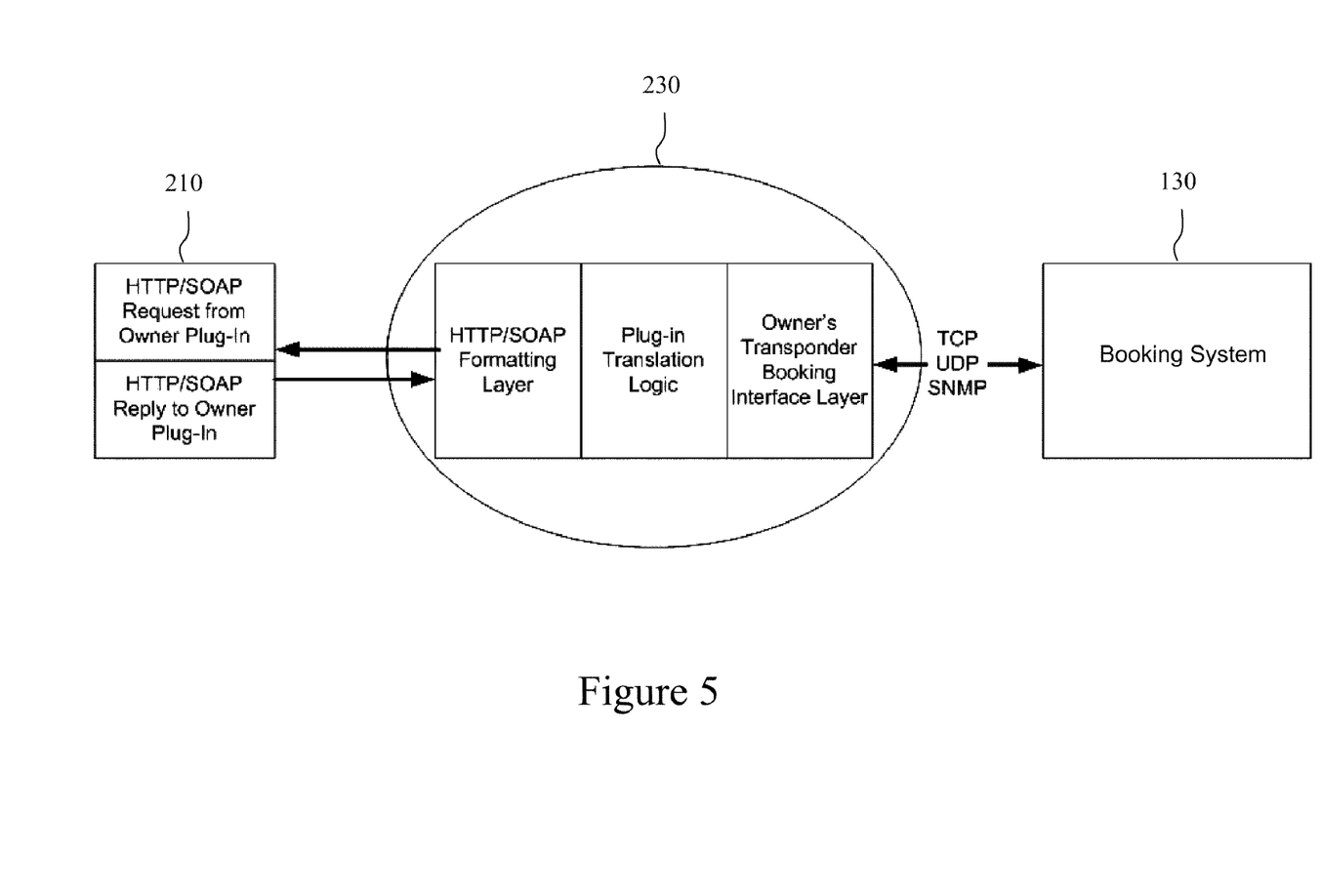
FIG. 5 provides a diagram of an exemplary module used to extract planned RF transmission parameter data according to an exemplary embodiment of the present disclosure; and, FIG. 6 provides a flow diagram of an exemplary method according to an exemplary embodiment of the present disclosure.

FIG. 5 depicts a diagram associated with an exemplary second plug-in module 230 for communicating planned RF transmission parameter data from a booking system 130 to server system 210. Second plug-in module 230 can be a booking plug-in module associated with a booking system 130 or associated with a stand-alone computing device. The second plug-in module 230 can initiate communications with server system 210 using, for instance, HTTP/SOAP requests. Server system 210 can return data to the second plug-in module 230 using, for instance, HTTP/SOAP replies. These messages can travel within a Virtual Private Network (VPN), can be encrypted using Secure Socket Layer (SSL) technology, or can be communicated using standard HTTP. Each request message can include a source ID which can be used to identify the particular second plug-in module 230.

After validating communications with server system 210, second plug-in module 230 can incrementally send heartbeat request messages to the server system 210, such as at about every 5.0 seconds. Second plug-in module 230 can also connect to booking system 130 to extract initial RF device booking parameters and/or data such as future changes for RF device booking parameters. The parameters extracted can include the entity transmitting on a particular RF device, the frequency span of the RF transmission, and start and end times. Request messages sent to server system 210 containing updated parameter values can be sent in between heartbeat messages. Server system 210 can respond to each request with an all clear code or notification of an RFI event.

In particular embodiments, user interface 240 can include a taskbar application that polls server system 210 for notifications and provides visual display of notifications to operators or other users. The taskbar application can initiate communications with server system 210 using HTTP/SOAP requests. Server system 210 can return data to the taskbar application using HTTP/SOAP replies. The messages can travel within a VPN, encrypted using SSL technology, or communicated using stand HTTP. Each request message can contain a source ID which uniquely identifies the taskbar application.

After the taskbar application validates communications with the server system 210, the taskbar application can periodically send heartbeat request messages to the server system 210, such as at about every 5.0 seconds. If an RFI even is active for a particular source, the reply message can contain information about the RF alert. The details can include a URL link to the collaborative web interface 250 that is pertinent to the RFI event. If a user desires to initiate an electronic chat with another user about an RFI event, the server system can reply with information about the RFI event and include the request to enter into the electronic chat conversation that is active on the collaborative web interface 250. They can also review documents, information, data, video conference, and "ping" other potential users.

Collaborative web interface 250 can be a website that provides a number of services for individuals associated with a particular RF industry. For instance, the collaborative web interface 250 can provide for an RFI event collaboration forum, statistical and historical reports, personal profile maintenance, corporate profile maintenance, taskbar application downloads, links to other RFI related sites, such as training sites and industry associations, audio, video, real time whiteboard and document storage etc.

The collaborative web interface 250 can provide for the selection of one of many active RFI events. When an RFI event is selected, an event details section can be populated with data provided by the RF device owner as well as other data contributed by users. The data display can be pertinent to diagnosing and solving the RFI event, for instance carrier ID or spectrum data. As discussed above, when spectrum data is available from two or more sources, the data can be overlaid so that the difference in the data can be easily identified to determine the source of RFI.

When an active RFI event is selected, a chat area can become populated with those that are chatting about the particular RFI event. The users are permitted to contribute to the chat conversation or they can send private messages directly to specific individuals. If an individual receives a message, but is not active in the chat conversation, the individual can be sent a notification through any other media or channels, such as, for instance, text message, email, or other suitable communication channel.

Collaborative web interface 250 can further include a statistical and historical reports section that provides access to a number of RFI reports. Examples of available reports can include, but are not limited to: (1) RFI event details that involve a specific company; (2) number of preventable RFI events for a time period; (3) number of actual RFI events for a time period; (4) number of active plug-in modules; (5) number of times a particular company experienced RFI; (6) number of times a particular company caused RFI; (7) details for RF transmissions that exceed allocated transmission time; as well as other reports that can be created using the data gathered from the RFI events and resources. Access to any of the reports or other statistical or historical analyses can be controlled pursuant to defined parameters.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing radio frequency (RF) interference in an RF system, the method comprising:
   receiving first transmission data, the first transmission data comprising first frequency data, first destination data, and first time data for at least one RF transmission associated with an RF device;
   receiving second transmission data, the second transmission data comprising second frequency data, second destination data, and second time data for at least one RF transmission;
   storing the first transmission data and the second transmission data in a database;
   determining if there is a conflict between the first transmission data and the second transmission data.

2. The method of claim 1, wherein the first transmission data is actual transmission data associated with a first RF transmission and the second transmission data is actual transmission data associated with a second RF transmission.

3. The method of claim 2, wherein a conflict is determined if there is at least a partial overlap between the first frequency data and the second frequency data, the first destination data and the second destination data, and the first time data and the second time data.

4. The method of claim 1, wherein the first transmission data is actual transmission data associated with a first RF transmission and the second transmission data is planned transmission data associated with the first RF transmission.

5. The method of claim 4, wherein a conflict is determined if the first frequency data is not the same as the second frequency data, if the first destination data is not the same as the second destination data, or if the first time data is not the same as the second time data.

6. The method of claim 1, wherein the first transmission data is planned transmission data for a first RF transmission and the second transmission data is planned transmission data for a second RF transmission.

7. The method of claim 6, wherein a conflict is determined if there is at least a partial overlap between the first frequency data and the second frequency data, the first destination data and the second destination data, and the first time data and the second time data.

8. The method of claim 1, wherein said method comprises providing a notification of the conflict.

9. The method of claim 1, wherein the first transmission data comprises an RF transmission routing table.

10. The method of claim 1, wherein at least one of the first transmission data or the second transmission data comprises the power level for an RF transmission, the method comprising providing a warning for the conflict if the power level for the RF transmission is less than the noise floor.

11. The method of claim 1, wherein the method comprises:
   receiving first spectrum data from a first location;
   receiving second spectrum data from a second location;
   overlaying the first spectrum data and the second spectrum data in a user interface to compare the first spectrum data and the second spectrum data;
   determining a source of the conflict from the comparison of the first spectrum data and the second spectrum data.

12. A system for reducing radio frequency (RF) interference in an RF system, the system comprising:
   a first module, the first module configured to collect first transmission data, the first transmission data comprising first frequency data, first destination data, and first time data for at least one RF transmission;
   a second module, the second module configured to collect second transmission data, the second transmission data comprising second frequency data, second destination data, and second time data for at least one RF transmission;
   a database configured to store the first transmission data and the second transmission data;
   a processor configured to analyze the first and second transmission data to determine if there is a conflict between the first transmission data and the second transmission data.

13. The system of claim 12, wherein the first transmission data is actual transmission data associated with a first RF transmission and the second transmission data is actual transmission parameter data associated with a second RF transmission.

14. The system of claim 13, wherein a conflict is determined if there is at least a partial overlap between the first frequency data and the second frequency data, the first destination data and the second destination data, and the first time data and the second time data.

15. The system of claim 12, wherein the first transmission data is actual transmission data associated with a first RF transmission and the second transmission data is planned transmission data associated with the first RF transmission.

16. The system of claim 15, wherein a conflict is determined if the first frequency data is not the same as to the second frequency data, if the first destination data is not the same as the second destination data, or if the first time data is not the same as the second time data.

17. The system of claim 12, wherein the first transmission data is planned transmission data for a first RF transmission and the second transmission data is planned transmission data for a second RF transmission.

18. The system of claim 17, wherein a conflict is determined if there is at least a partial overlap between the first frequency data and the second frequency data, the first destination data and the second destination data, and the first time data and the second time data.

19. The system of claim 12, wherein the system further comprises a notification system to provide notification of the conflict.

20. The system of claim 12, wherein the first module is a first plug-in associated with a control system for at least one RF device.

21. The system of claim 12, wherein the second module is a second plug-in associated with a booking system for at least one RF device.

22. The system of claim 12, wherein the first module or the second module is a firmware plug-in module associated with at least one RF device.

23. The system of claim 12, wherein the system further comprises a collaborative web interface.

24. The system of claim 12, wherein the first transmission comprises an RF transmission routing table.

25. A method for reducing radio frequency interference in an RF communications system, the method comprising:

receiving actual transmission data, the actual transmission data comprising frequency data, destination data, and time data for a plurality of actual RF transmissions;

receiving planned transmission data, the planned transmission data comprising frequency data, destination data, and time data for the plurality of planned RF transmissions;

storing the actual transmission data and the planned transmission data in a database, analyzing the actual transmission data to determine if there is a conflict between the plurality of the actual RF transmissions based at least in part on the frequency data, destination data, and time data for the plurality of actual RF transmissions;

comparing the actual transmission data to the planned transmission parameter data to determine if there are any conflicts between the actual transmission data and the planned transmission data;

providing a notification of any determined conflicts.

* * * * *